US006918520B2

(12) United States Patent
Skinner

(10) Patent No.: US 6,918,520 B2
(45) Date of Patent: Jul. 19, 2005

(54) SPARE TIRE HOLDER

(76) Inventor: Donald Edward Skinner, 3788 Skeels Rd., Holton, MI (US) 49425

(*) Notice: Subject to any disclaimer, the term of this patent is extended or adjusted under 35 U.S.C. 154(b) by 161 days.

(21) Appl. No.: 10/630,825

(22) Filed: Jul. 31, 2003

(65) Prior Publication Data

US 2005/0023315 A1 Feb. 3, 2005

(51) Int. Cl.[7] .................................................. B60R 9/06

(52) U.S. Cl. .................... 224/282; 224/42.21; 224/402; 224/497; 224/504; 224/506

(58) Field of Search .............................. 224/42.21, 282, 224/402, 497, 519, 504–506; 280/767

(56) References Cited

U.S. PATENT DOCUMENTS 3,387,754 A * 6/1968 Sinkey et al. ............ 224/42.21
3,613,971 A * 10/1971 Betz ........................ 224/42.21
4,485,945 A * 12/1984 Ankeny ...................... 224/504
4,561,575 A * 12/1985 Jones ...................... 224/42.21
4,767,038 A * 8/1988 McVicar ..................... 224/505
5,303,857 A * 4/1994 Hewson ...................... 224/506
5,370,285 A * 12/1994 Steelman ................ 224/42.21
5,469,998 A * 11/1995 Van Dusen et al. ......... 224/506
5,529,231 A * 6/1996 Burgess ...................... 224/502
5,775,560 A * 7/1998 Zahn et al. ................. 224/506
5,845,831 A * 12/1998 Nusbaum et al. ........... 224/505
6,206,259 B1 * 3/2001 Brungardt et al. .......... 224/497
6,547,116 B2 * 4/2003 Anderson et al. ........... 224/506

* cited by examiner

*Primary Examiner*—Gary E. Elkins

(57) ABSTRACT

A spare tire holder device mounted in a hitch receiver and holding the spare tire upright behind the tail gate of a pickup truck. The device is rotatable so the holder maintains the spare tire upright in a normal position and can be rotated away so as to hold the spare tire in a horizontal position to allow opening of the tail gate without removing the mount device from the truck.

2 Claims, 5 Drawing Sheets

84
26
38
28
24
36
18
16
22
30
38
28
36
32
12
53
68
80
42
51
52
40
50
46
44
48
54
58
14
62
66
66
66

SPARE TIRE HOLDER

BACKGROUND OF THE INVENTION

1. Field of the Invention

The present invention relates to spare tire mounts on vehicles. More particularly, the present invention relates to a spare tire mount mounted in a hitch receiver and holding the spare tire upright behind the tail gate of a pickup truck.

2. Description of Related Art

The problems associated with the removal and mounting of a spare tire to a spare tire mount located under a pickup truck bed. This requires bending over or crawling on the ground to remove the spare tire. Remounting is awkward and difficult. It is well known to mount a tire vertically behind a van or recreational vehicle where a rear door, if present, is swung open from the side. Such vertical mounts allow easy removal and mounting of the spare tire. A permanent mounting bracket is provided for this application. It would be desirable to provide a removable spare tire mount which is useful for carrying a spare tire behind a tail gate of a pickup truck without direct attachment of the mount to the tail gate. It would also be desirable to provide such a removable spare tire mount which allows the mounted spare tire to swing back to allow clearance for lowering the pickup tailgate without removal of the mount or the spare tire.

U.S. Pat. No. 5,370,285, issued Dec. 6, 1997, to Steelman, describes a spare tire rack pivotally mounted by a hinge on a telescopic hitch mechanism.

U.S. Pat. No. 4,483,468, issued Nov. 20, 1984, to Lucas, describes a tire mount for vehicles, such as trucks, including a frame member formed to nest within a bumper. The tire mount includes a swing arm affixed to the frame by a pivot point.

U.S. Pat. No. 3,343,736, issued Sep. 26, 1967, to Sellers, describes a spare tire carrier comprising a base mounted on the bumper of a vehicle and a tubular body pivotally mounted on the base. The tubular body is mounted pivotally between vertical and horizontal positions.

U.S. Pat. No. 4,485,945, issued Dec. 4, 1984, to Ankemy, describes a spare tire carrier pivotally mounted on the bumper of a pickup which swings down with the opening of the tailgate of a pickup.

None of the above inventions and patents, taken either singly or in combination, is seen to describe the instant invention as claimed.

SUMMARY OF THE INVENTION

The present invention is a spare tire holder which includes an arm that fits into the hitch receiver of a vehicle, such as a pickup truck having a tailgate. A rear opening vertical channel is attached to the outer end of the arm by welding. A rectangular tube is pivotally attached to the lower portion of the vertical channel so that, when the rectangular tube is in a raised position, it fits into the vertical channel. A short support arm extends rearward from the rectangular tube on which is mounted a plate for holding the spare tire in a vertical position by means of bores aligning with the lug bores of the spare tire and receiving the removable lugs fastened by lug nuts.

There is a through bore in the vertical channel aligned with a through bore in the rectangular tube the through bores being located at a point above the pivot point and which receives a removable pin for locking the rectangular tube in a vertical position. Upon removal or the pin, the rectangular tube may be swung downward to a horizontal position, along with the attached spare tire mounted on the mounting plate. This provides clearance for swinging downward the tailgate of the pickup truck.

Accordingly, it is a principal object of the invention to provide a spare tire mount for trucks which holds the tire in a vertical position behind the truck bed for ease of dismounting and mounting the spare tire.

It is another object of the invention to provide a spare tire mount as above which swings down to a horizontal position to allow access to the bed of a truck.

It is a further object of the invention to provide a spare tire mount as above mountable on the rear of a pickup truck which may be swung downward to allow the opening of the pickup truck tailgate.

Still another object of the invention is to provide a spare tire mount as above which does not require permanent attachment to the pickup truck.

Yet another object of the invention es to provide a spare tire mount as above which is removably mounted in a hitch receiver of the vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a spare tire holder device mounted in a hitch receiver and holding the spare tire upright behind the tail gate of a pickup truck. The device is rotatable so the holder maintains the spare tire upright in a normal position and can be rotated away so as to hold the spare tire in a horizontal position to allow opening of the tail gate without removing the mount device from the truck.

Figure 1:
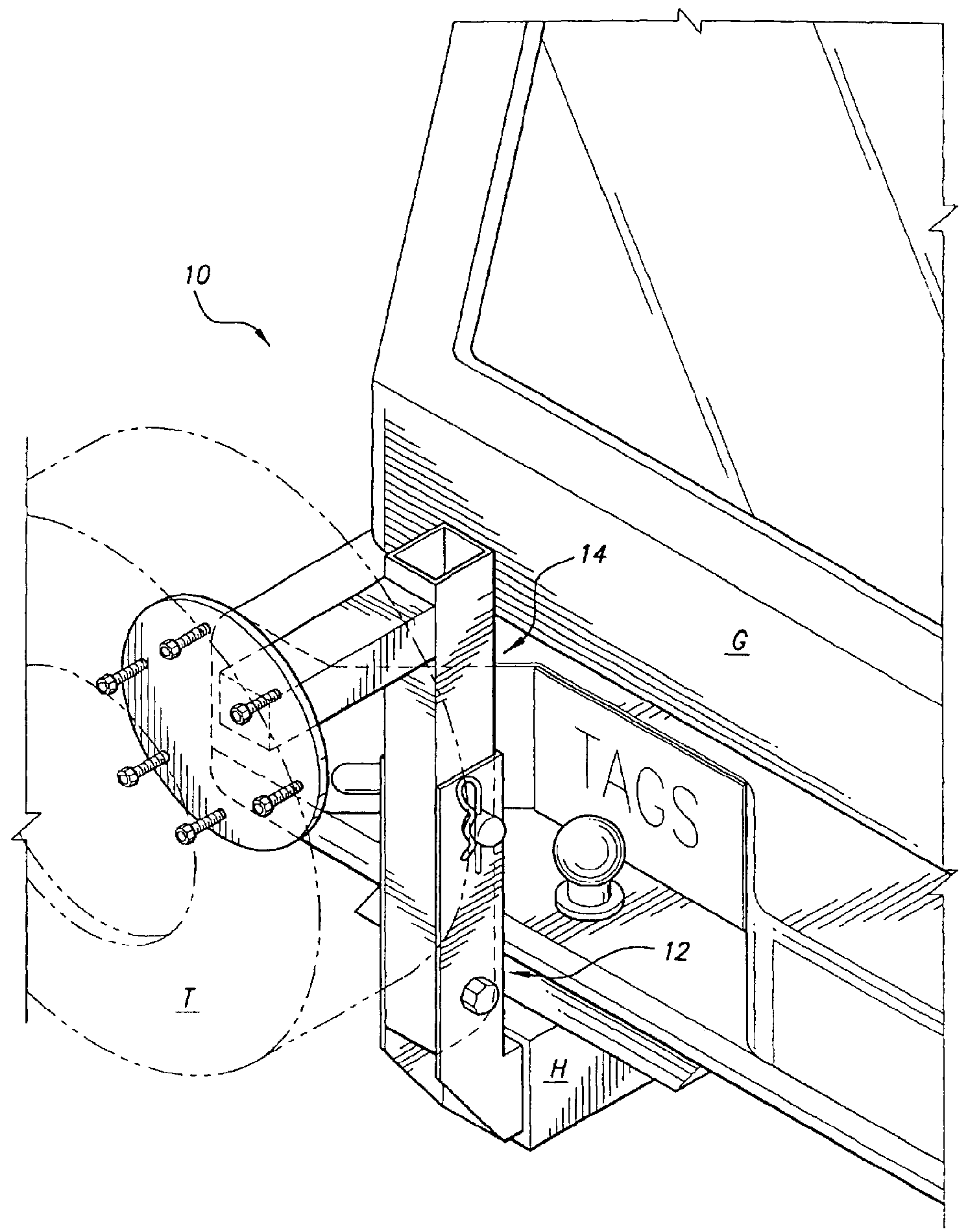
FIG. 1 is an environmental, perspective view of a spare tire holder according to the present invention.
Figure 2:
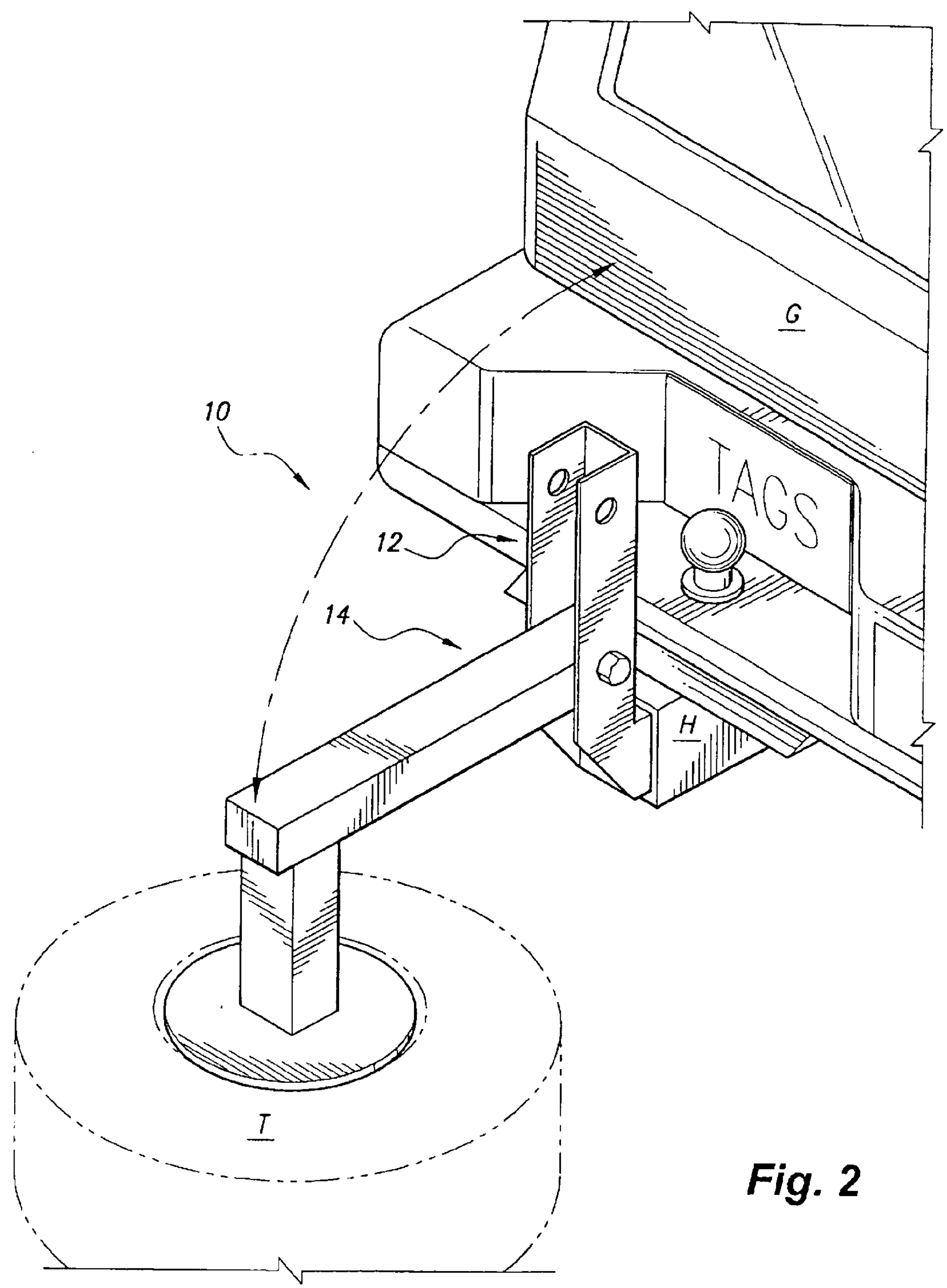
FIG. 2 is an environmental perspective view of the holder of FIG. 1 in a rotated position.

Referring to FIGS. 1 and 2, there are shown environmental perspective views of the inventive spare tire holder in the normal upright position and the rotated position, respectively. Spare tire holder 10 has an upright portion 12 mounted in hitch receiver H of pickup truck P and supports holder pivoting portion 14. Holder pivoting portion 14 supports spare tire T in a vertical position spaced behind the closed tailgate G when in the normal position as in FIG. 1. Holder pivoting portion 14 pivots back away from tailgate T to a horizontal position, moving spare tire T into a horizontal position so as to allow tailgate T to be opened without removing the spare tire and holder from pickup truck P as seen in FIG. 2.

Figure 3:
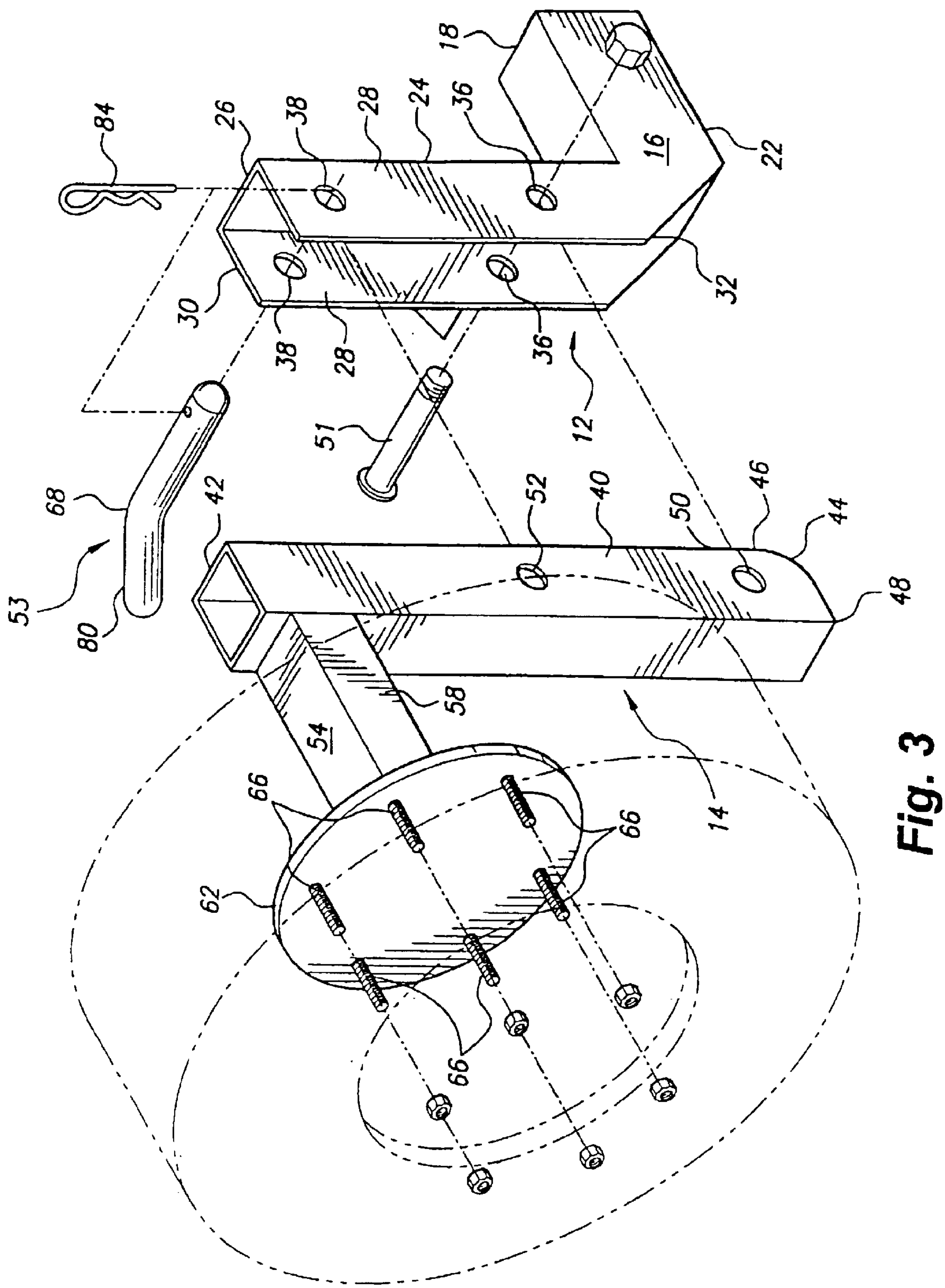
FIG. 3 is an exploded view of the spare tire holder of FIG. 1
Figure 4:
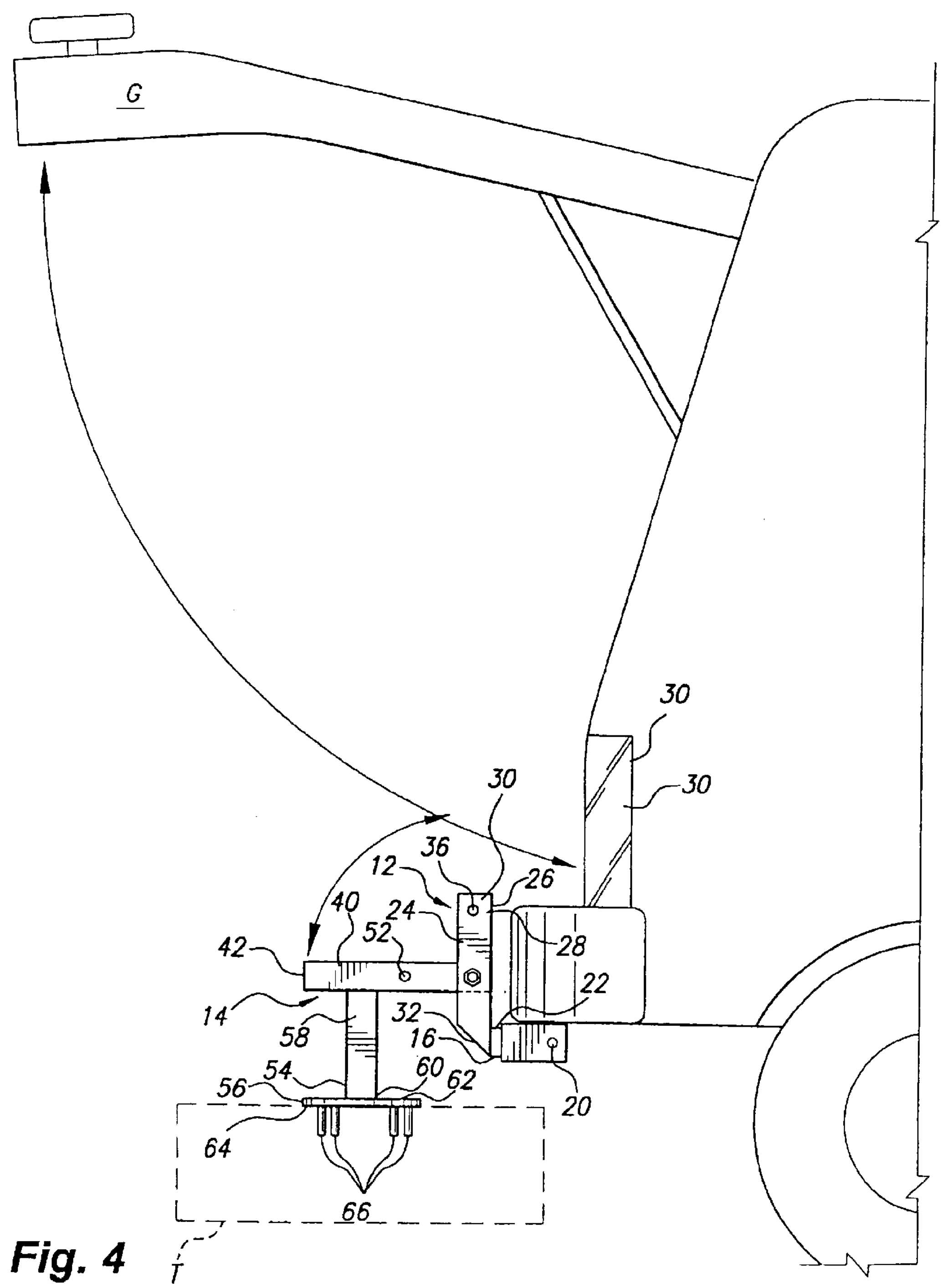
FIG. 4 is a side elevation view of the spare tire holder of FIG. 1 in a rotated position with an upward lifting tailgate.
Figure 5:
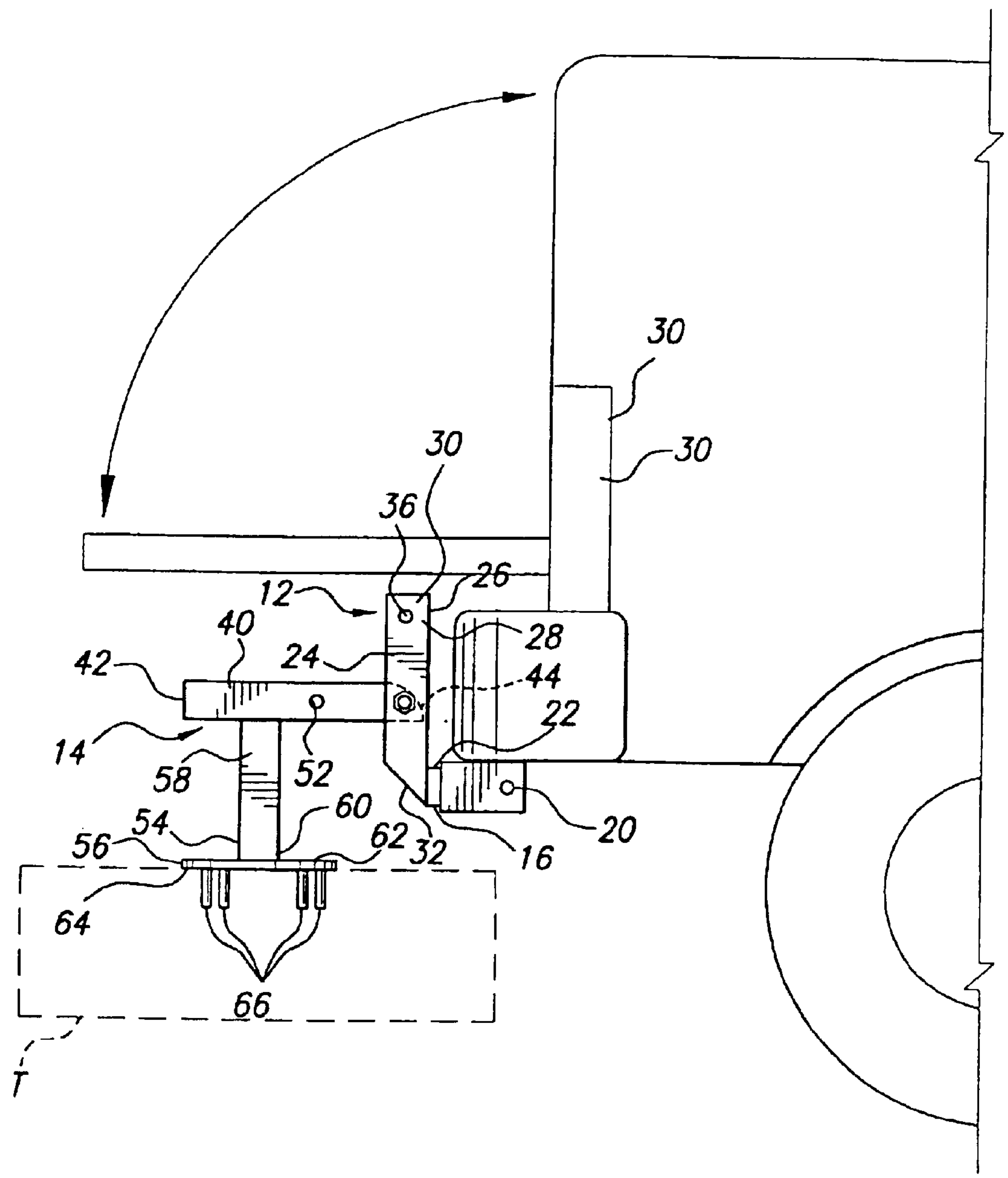
FIG. 5 is a side elevation view similar to FIG. 4 with a downward opening tailgate.

Referring to FIGS. 3, 4, and 5 there are shown an exploded view, a side elevation view with a upward lifting tailgate, and a side elevation view with a downward opening tailgate, respectively, of the inventive spare tire holder 10. Spare tire holder 10 has an upright portion 12 for mounting in a hitch receiver(see FIGS. 1 and 2) by means of insert member 16 which is tubular in form and so sized as to be slidably received in the hitch receiver H. Insert member 16 has an inner end 18 with horizontal bores 20 spaced outward therefrom matching similarly situated bores on hitch receiver H for securing insert member 16 in hitch receiver H by means of a securing pin(not shown). Insert member outer end 22 is perpendicularly attached to and supports vertical channel member 24 by means such as by welding. Vertical channel member 24 has a front wall 26 and parallel side walls 28 and has an upper end 30 and a lower end 32. Upper end 30 is located slightly below the level of tailgate G when insert member 16 is mounted in hitch receiver is mounted in hitch receiver H. Vertical channel member lower end 32 is attached to insert member outer end 22 at front wall 26 and side walls 28 are preferably cut at an upward angle of 45 degrees from horizontal from the front wall 26 of lower end 32. Vertical channel member 24 has horizontally aligned pivot bores 36 in side walls 28, respectively, and spaced upward from insert member 16. Vertical channel member 24 further has horizontally aligned securing bores 38 spaced below upper end 30.

Pivoting portion 14 has a vertical tubular member of square cross section and is of such width as to fit between side walls 28 of vertical channel member 24. Pivoting portion 14 has an upper end 42 and a curved lower end 44 having an inner end 46 and curving downward to outer end 48. Pivoting portion 14 has horizontally aligned pivot bores 50 which correspond with pivot bores 36 of vertical channel member 24. A pivot bolt and nut 51 inserted through pivot bores 36 of vertical channel member 24 and pivot bores 50 of pivoting portion vertical member 40 provides a pivoting connection between upright portion 12 and pivoting portion 14, pivoting portion vertical member 40 fitting between side walls 28 of vertical channel member 24. Pivot bores 50 of vertical members 40 are spaced upward from curved lower end 44 such a distance and the curve of curved lower end 44 is so shaped that upon rotation outward from vertical channel member 24 about pivot bolt 51, curved end inner end 46 clears the front wall 26 of vertical channel member 24 and the remainder of curved end 44 continues to clear front wall 26 upon further rotation until curved end outer end 48 comes in contact with front wall 26 when vertical member 40 reaches a horizontal position, thereby forming an interference fit and preventing further rotation.

Pivoting portion vertical member 40, when in a normal position vertical position, has securing bores 52 spaced upward from pivot bores 50 such a distance that when vertical member 40 is attached to vertical channel member 24 by pivot bolt 51, securing bores 52 align with securing bores 38. In this position, vertical member 40 is secured in a normal position by securing pin 53 passing through vertical channel securing bores 38 and vertical member securing bores 52. Securing pin 53 has a pin shaft 68 with an angled handle 80 at one end and a cotter pin hole near the other end and secured in place by a cotter pin 84. The securing pin shaft 68 is inserted through securing bores 38 and 52 where the angled handle 80 and the cotter pin 84 inserted in cotter pin hole 82 maintaining securing pin 53 in place during travel.

Support arm 54 connects mounting plate 56 and the rear wall of pivoting portion vertical member 40 in a parallel spaced apart relation. Support arm front end 58 is perpendicularly attached such as by welding to vertical member 40 at a point between upper end 42 and securing bores 52 and is likewise perpendicularly attached at rear end 60 to mounting plate front side 62 at a central portion thereof. Mounting plate 56 has a rear side 64 from which at least three mounting plate lug bolts 66 extend outwardly to receive lug receiving bores on a spare tire rim. A spare time may be mounted on mounting plate 56 by placing the spare tire rim over the lug bolts and securing it by tightening lug nuts onto the lug bolts 66.

In operation pivoting portion vertical member 40 is normally secured in a vertical position by securing pin 53 mounted in securing bores 38 and 52. In this position, spare tire T, mounted on mounting plate 56, is in a vertical position spaced from the tailgate G. When it is desired to open tailgate G, securing pin cotter pin 82 is removed from cotter pin hole 82 and securing pin handle 80 grasped and securing pin shaft 68 pulled from securing bores 38 and 52. Vertical member 40 may then be pivoted around pivot bolt 51 until reaching a horizontal position where curved end outer end 48 interferes with the front wall of vertical channel member 24, maintaining vertical member 40 and the mounted spare tire at a horizontal position below the level of tailgate G. Tailgate G may then be opened to a horizontal position. Once the tailgate is closed, horizontally disposed vertical member 40 may be pivoted around pivot bolt 51 until vertical and securing pin 53 installed. The pickup truck or similar vehicle is then ready to travel as desired.

It is to be understood that the present invention is not limited to the sole embodiment described above, but encompasses any and all embodiments within the scope of the following claims.

I claim:

1. A spare tire holder for a vehicle such as a pickup truck having a tailgate and having a rear mounted hitch receiver said spare tire holder comprising:

an upright portion comprising:

a horizontally disposed hitch receiver insert member having a front insert end and a rear outer end; and a vertically disposed channel member having a front wall and opposing side walls, an upper end and a lower end, and being connected perpendicular to said outer end of said insert portion at said lower end thereof;

said channel member defining a horizontally aligned pivot bores in said opposing side walls and spaced upward from said insert member;

said channel member defining horizontally aligned securing bores in said opposing side walls and spaced upward from said pivot bores;

said channel member being of such length that when said insert member is inserted in said hitch receiver, said upper end is spaced below the pickup tailgate;

a pivoting portion comprising:

a vertical member having a rectangular cross section having an upper end and a curved lower end;

said vertical member being so sized and configured as to fit between said opposing sides of said upright portion channel member;

said vertical member defining a horizontally disposed pivot bore spaced above said curved lower end;

said vertical member defining a horizontally disposed securing bore spaced above said pivot bore;

a horizontally disposed support arm having a front end and a rear end, said rear end being connected perpendicular to said vertical member and spaced above said securing bore;

a vertically disposed spare tire mounting plate having a front side and a rear side, said rear side having a central portion, said central portion being connected perpendicular to said rear end of said support arm, said vertically disposed mounting plate having a plurality of lugs extending rearward from said rear side and so arranged as to receive corresponding lug bores of a spare tire rim;

said support arm being of such a length as to provide clearance between a spare tire mounted on said mounting plate and said pivoting portion vertical member;

a pivot bolt extending through said pivot bores of said upright portion vertical channel member and said pivot bores of said pivoting portion vertical member;

said lower curved end of said vertical channel member being so configured as to allow said pivoting portion vertical merger to rotate toward the rear to a horizontal position;

said securing bores of said channel member and said pivoting portion vertical member being so positioned as to be aligned to receive a securing pin; and a securing pin removably mounted within said securing bores of said vertical channel member and said pivoting portion vertical member whereby, upon removal of said securing pin from said securing bores, said pivoting portion of said spare tire holder may be rotated along with the spare tire to the rear to a horizontal position thus providing clearance for the lowering of the tailgate of the pickup truck to be lowered from a vertical closed position to a horizontal open position.

2. The spare tire holder of claim 1, wherein said lower curved end of said pivoting portion vertical member is so configured as to interfere with said vertical channel member front wall at a point where said pivoting portion vertical member is rotated to a horizontal position, thus maintaining said pivoting portion vertical member and the attached spare tire at a horizontal position.

* * * * *